(12) United States Patent
Fardoun et al.

(10) Patent No.: US 7,163,080 B2
(45) Date of Patent: Jan. 16, 2007

(54) METHOD AND APPARATUS FOR DETECTING A FAILED TEMPERATURE SENSOR IN AN ELECTRIC ASSIST STEERING SYSTEM

(75) Inventors: Abbas A. Fardoun, Dearborn, MI (US); Joseph D. Miller, Farmington Hills, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 11/078,028

(22) Filed: Mar. 11, 2005

(65) Prior Publication Data

US 2006/0201736 A1   Sep. 14, 2006

(51) Int. Cl.
  *B62D 5/04* (2006.01)
(52) U.S. Cl. .................. 180/446; 180/402; 701/43; 701/41; 701/42
(58) Field of Classification Search .............. 180/446
  See application file for complete search history.

(56) References Cited

U.S. PATENT DOCUMENTS

| 5,257,828 | A | | 11/1993 | Miller et al. | |
|---|---|---|---|---|---|
| 5,475,289 | A | * | 12/1995 | McLaughlin et al. | ....... 318/432 |
| 5,517,415 | A | | 5/1996 | Miller et al. | |
| 5,623,409 | A | | 4/1997 | Miller | |
| 5,787,376 | A | * | 7/1998 | Nishino et al. | ............... 701/41 |
| 5,992,556 | A | | 11/1999 | Miller | |
| 6,046,560 | A | * | 4/2000 | Lu et al. | .................. 318/432 |
| 6,088,661 | A | | 7/2000 | Poublon | |
| 6,107,767 | A | * | 8/2000 | Lu et al. | .................. 318/561 |
| 6,295,879 | B1 | | 10/2001 | Miller et al. | |
| 6,338,016 | B1 | * | 1/2002 | Miller et al. | ................ 701/43 |
| 6,422,335 | B1 | | 7/2002 | Miller | |
| 6,448,731 | B1 | * | 9/2002 | Miller et al. | ............... 318/488 |
| 6,845,309 | B1 | * | 1/2005 | Recker et al. | ............... 701/41 |

FOREIGN PATENT DOCUMENTS

| EP | 1284541 | 2/2003 |
|---|---|---|
| JP | 2003 134869 | 5/2003 |
| JP | 2003 070285 | 7/2005 |

* cited by examiner

*Primary Examiner*—Lesley D. Morris
*Assistant Examiner*—Marlon Arce-Diaz
(74) *Attorney, Agent, or Firm*—MacMillan, Sobanski & Todd, LLC

(57) ABSTRACT

A method and system are provided for controlling an electric assist motor in a vehicle steering system during an enablement of an overuse algorithm. Electric power is provided to the electric assist motor of the vehicle steering system via a switching circuit. Temperature of one of at least electric assist motor and power driving circuitry that provides power to the electric assist motor is sensed. A determination is made whether the sensed temperature of the one of at least electric assist motor and power driving circuitry is increasing over a predetermined period of time. The electric power provided to electric assist motor is reduced in response to a lack of increase in said sensed temperature.

20 Claims, 4 Drawing Sheets

METHOD AND APPARATUS FOR DETECTING A FAILED TEMPERATURE SENSOR IN AN ELECTRIC ASSIST STEERING SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention is directed to an electric assist steering system, and, more particularly, to a method and apparatus for detecting a failed thermistor in an electric assist steering system and controlling the electrical steering motor.

2. Description of the Related Art

Electric assist steering systems are well known in the art. In such electric assist steering systems, an electric assist motor, when energized, provides torque assist to aid the driver in turning steerable wheels of the vehicle. The electric assist motor is typically controlled in response to both steering torque applied to the vehicle steering wheel and measured vehicle speed. A controller monitors steering torque and controls a drive circuit to, in turn, control current applied to the electric assist motor. Such drive circuits typically include field effect transistors (FET's) or other forms of solid state switches operatively coupled between the vehicle battery and the electric assist motor. Current is controlled by pulse width modulation of the FET's or switches.

If steering torque is applied and the steerable wheels are held immovable, such as when the wheels are against a curb, the temperature of both the electric assist motor and the FET's rise. Such a condition is referred to as a stall condition of the electric assist motor. If the stall condition lasts for an extended period, the motor and/or FET's can overheat and fail.

U.S. Pat. No. 6,338,016 to Miller et. al. discloses an electric assist steering system that includes a stall detection apparatus for an electric assist steering system. A temperature sensor monitors the temperature of a power switch. A stall detector operatively reduces power to the electric assist motor to a respective power level for reducing the output torque of the electric assist motor in response to the respective temperature threshold measured.

U.S. Pat. No. 5,517,415 to Miller, which is assigned to TRW, Inc., discloses a stall detection apparatus for an electric assist steering system. A stall detector controls electrical current which is supplied to the electric motor in response to detecting the occurrence of a stall condition. This prevents damage to both the motor and drive circuitry.

U.S. Pat. No. 4,532,567 to Kade discloses an electric assist steering system which measures actual current through the motor. If the measured current exceeds a limit, the motor drive current is reduced.

U.S. Pat. No. 5,097,918 to Daido et al. discloses an electric assist steering system that includes an electric assist motor connected to a steering mechanism through an electromagnetic clutch. The system further includes a sensor for sensing rotational motion of the electric assist motor. When torque is sensed and the rotary sensor indicates that the motor is not rotating, the system disengages the electromagnetic clutch.

U.S. Pat. No. 4,878,004 to Shimizu discloses an electric assist steering system that includes an electric assist motor and a controller for controlling operation of the motor. The system further includes a current sensor which senses the magnitude of the actual current through the electric assist motor. An average value motor current is determined. The motor is controlled in response to the determined average current value.

The above references disclose methods for sensing current supplied to the electric motor for detecting a stall or over-use condition and adjusting the current level supplied to the electric motor for operating the electric motor at an operating level that prevents damage to the electric motor. One method used for detecting power dissipated by the electric motor and motor driving circuitry is to utilize a temperature sensor for monitoring the temperature of the power driving circuitry or the electric motor. Based on a respective temperature threshold reached, the current is reduced. However, none of the systems identify a method for detecting a failed temperature sensor which would result in the electric assist motor operating under full load when it is not desirable to do so. Under such conditions, if the temperature sensor is non-operational, damage to the system and loss of steering assist may occur.

SUMMARY OF THE INVENTION

The present invention has the advantage of detecting a failed temperature sensor in an electric assist steering system and controlling the electric power to the electric assist motor in response thereto for protecting the electric assist motor from over-use and damage.

In one aspect of the present invention, a method is provided for controlling an electric assist motor in a vehicle steering system during an enablement of an overuse algorithm. Electric power is provided to the electric assist motor of the vehicle steering system via a switching circuit. Temperature of one of at least an electric assist motor and a power driving circuitry that provides power to the electric assist motor is sensed. A determination is made whether the sensed temperature of the one of the at least electric assist motor and power driving circuitry is increasing over a predetermined period of time. The electric power provided to electric assist motor is reduced in response to the sensed a lack of increase in said sensed temperature.

DETAILED DESCRIPTION OF PREFERRED EMBODIMENTS

Figure 1:
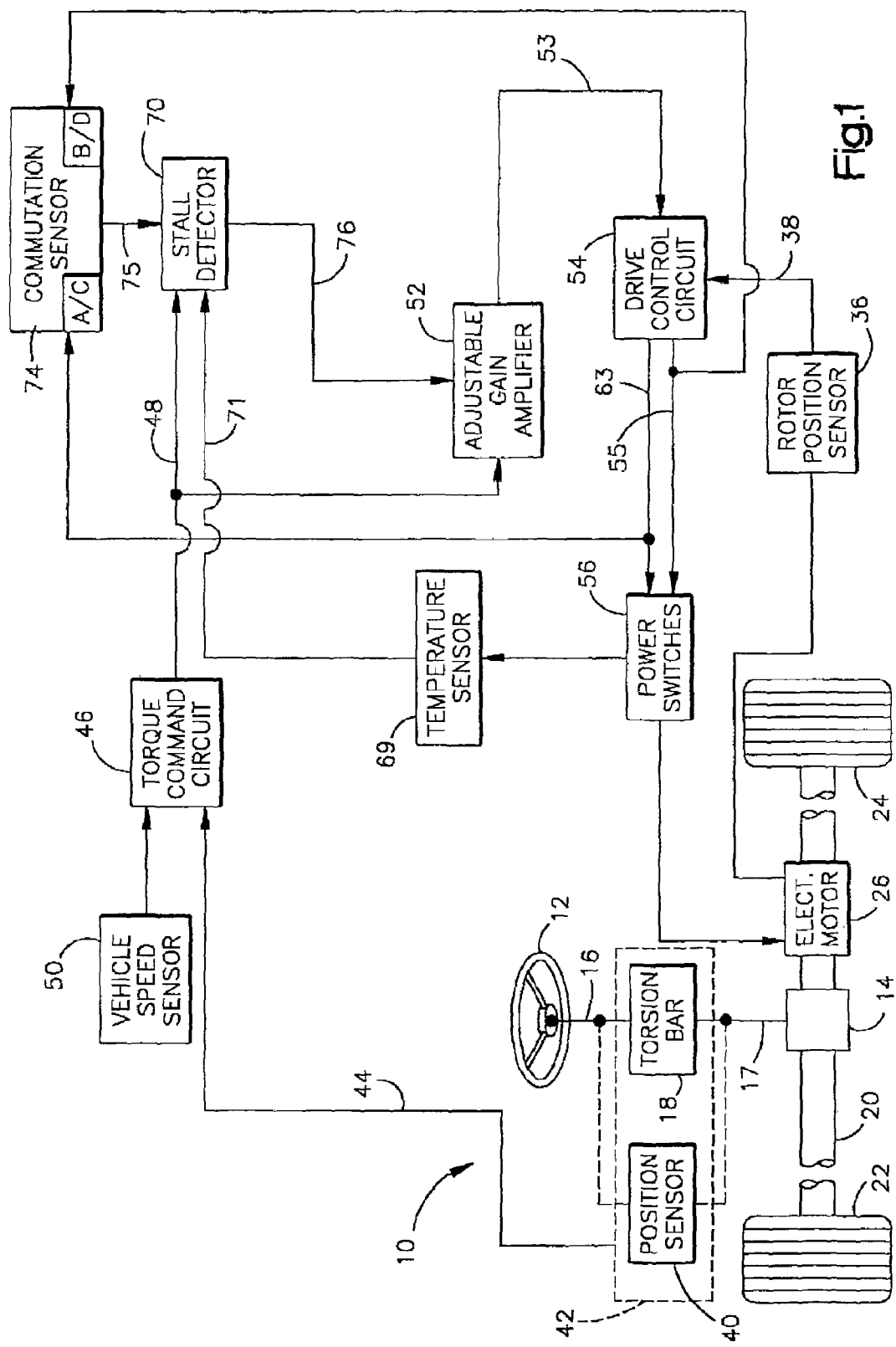
FIG. 1 is a block diagram illustrating an electric assist steering system made in accordance with the present invention.

FIG. 1 illustrates a preferred embodiment of a vehicle electric assist steering system 10 in accordance with the present invention. The system 10 includes a vehicle steering wheel 12 connected to an input shaft 16 and a pinion gear 14 connected to a pinion shaft 17. The input shaft 16 is coupled to the pinion shaft 17 through a torsion bar 18. The torsion bar 18 twists in response to torque applied to the vehicle steering wheel 12 to permit relative rotation between the input shaft 16 and the pinion shaft 17. Stops, not shown, limit the amount of relative rotation between the input shaft 16 and the pinion shaft 17 in a manner known in the art.

The pinion gear 14 has a set of helical gear teeth (not shown) which meshingly engage a set of straight cut gear teeth (not shown) on a linear steering member or rack 20. The rack 20 is coupled to vehicle steerable wheels 22, 24 with steering linkage in a known manner. The pinion gear 14 together with the rack 20 forms a rack and pinion gear set. When the steering wheel 12 is turned, the rack and pinion gear set converts the rotary motion of the steering wheel into linear motion of the rack 20. When the rack 20 moves linearly, the steerable wheels 22 and 24 pivot about their associated steering axis and the vehicle is steered.

An electric assist motor 26 is drivingly connected with the rack 20 through, preferably, a ball-nut drive arrangement (not shown). It will be understood and appreciated that the apparatus and method of the present invention are equally applicable to other types of drive arrangements. The motor 26, when energized, provides assist to aid in steering movement of the rack 20. In a preferred embodiment of the present invention, the motor 26 is a variable reluctance motor. A variable reluctance motor is preferred because of its relatively small size, low friction, and high torque-to-inertia ratio.

Figure 2:
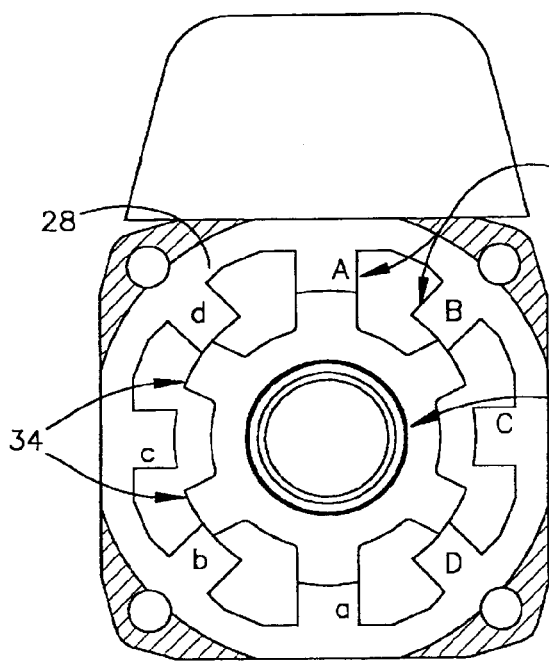
FIG. 2 is a cross-sectional view of the electric assist motor shown in FIG. 1.

The motor 26 includes a stator 28 (FIG. 2) having a plurality of stator poles 30. Associated with each stator pole 30 is a stator coil (not shown) wrapped around the stator pole. The motor 26 also includes a rotor 32 having a plurality of rotor poles 34. In the preferred embodiment, the motor 26 is a four phase motor which includes eight stator poles 30 and six rotor poles 34.

The stator poles 30 are arranged so as to be energized in pairs designated Aa, Bb, Cc, and Dd. When a pair of stator poles 30 is energized, the rotor 32 moves so as to minimize the reluctance between the energized stator poles and the rotor poles 34. Minimum reluctance occurs when a pair of rotor poles 34 is aligned with the energized stator poles 30. For example, in the position of the motor 26 illustrated in FIG. 2, there is minimum reluctance between the pair of stator poles Aa and the rotor poles 34 which are aligned with the stator poles Aa. Once minimum reluctance is achieved, as determined by the relative position of the rotor and stator, the energized stator poles 30 are de-energized and an adjacent pair of stator poles is energized to continue to cause rotation of the rotor 32.

The direction of rotation of the rotor 32 is controlled by the sequence in which the stator poles 30 are energized. For example, to rotate the rotor 32 clockwise from its position in FIG. 2, the stator pole pair Dd is next energized. To rotate the rotor 32 counterclockwise from the position illustrated in FIG. 2, the stator pole pair Bb is next energized.

The torque produced by the motor 26 is controlled by the amount of current through the stator coils. A preferred manner for controlling a variable reluctance motor so as to control motor torque and direction is fully disclosed in U.S. Pat. No. 5,257,828 to Miller et al., and assigned to TRW Inc., the disclosure of which is fully incorporated herein by reference.

As illustrated in FIG. 1, a rotor position sensor 36 senses the position of the rotor 32 relative to the stator 28 and provides a rotor position signal 38 indicative of that relative position. In the preferred embodiment, the rotor position sensor 36 is a discrete sensor. It is contemplated that, alternatively, operating parameters of the motor 26 can be used to sense rotor position. For example, rotor position can be determined by monitoring the current through the stator coils associated with unenergized stator poles 30. One suitable arrangement for sensing rotor position without a discrete sensor is disclosed in U.S. Pat. No. 5,072,166, which is incorporated herein by reference.

Referring back to FIG. 1, a shaft position sensor 40 is connected with the input shaft 16 and the output shaft 17. The shaft position sensor 40 in combination with the torsion bar 18 forms a torque sensor indicated schematically at 42. The shaft position sensor 40 provides a signal 44 indicative of the relative rotational position between the input shaft 16 and the output shaft 17. The relative rotational position between the input shaft 16 and the output shaft 17 is indicative of the steering torque applied by the vehicle operator to the vehicle steering wheel 12. Therefore, the output signal 44 of the shaft position sensor 40 is indicative of the steering torque applied to the vehicle steering wheel 12 and is referred to as the applied steering torque signal.

The applied steering torque signal 44 is connected to a torque command circuit 46. The torque command circuit 46 determines the assist torque desired from the motor 26. The assist torque determined by the torque command circuit 46 is a function of two parameters: (i) the value of the applied steering torque signal 44, and (ii) vehicle speed. A vehicle speed sensor 50 provides a vehicle speed signal to the torque command circuit 44 indicative of the vehicle speed. Typically, the amount of torque assist desired from the motor 26 decreases as vehicle speed increases. This is referred to in the art as speed proportional steering.

The torque command circuit 46 provides a torque command signal 48 indicative of the torque assist value which is desired from the assist motor 26. The torque command signal 48 is output to an adjustable gain amplifier 52. The adjustable gain amplifier 52 amplifies the torque command signal 48 and outputs an amplified torque command signal 53.

The amplified torque command signal 53 is connected to a drive control circuit 54. Preferably, the drive control circuit 54 is a microprocessor or microcomputer. Alternatively, the drive control circuit 54 may be an integrated circuit or part of a larger control circuit configured to control the electric assist motor 26. The rotor position signal 38 is also connected to the drive control circuit 54. The drive control circuit 54 utilizes the amplified torque command signal 53 and the rotor position signal 38 to determine the required motor energization current and motor energization sequence to achieve the requested steering direction. The drive control circuit 54 outputs motor control signals 55 and 63 to a set of power switches 56. The motor control signals 55 and 63 control which stator pole pair (i.e., Aa, Bb, Cc, or Dd) or pairs are energized and also control the energization current. Although a pair of control lines 55 and 63 is shown, each pole pair typically has its own associated control line, i.e., there are four control lines between the drive control circuit 54 and the power switches 56. It will be appreciated that the apparatus and method of the present invention also is applicable to other drive control and power switching arrangements, such as where each stator pole pair is controlled by two or more power switches.

The power switches 56 are pulse width modulated to control the motor current. To ensure smooth operation of the motor 26, the position of the rotor 30 can be estimated at predetermined times between actual rotor position measurements. This estimation is made on the basis of certain known conditions and certain assumptions. Suitable methods of rotor position estimation are described in an IEEE paper entitled "A Simple Motion Estimator For VR Motors" by W. D. Harris and J. H. Lang, IEEE Industry Applications Society Annual Meeting, October 1988 and in a paper entitled "A State Observer for Variable Reluctance Motors: Analysis and Experiments" by A. Lumsdaine, J. H. Lang, and M. J. Balas, 19th ASILOMAR Conference on Circuits, Systems & Computers, Nov. 6–8, 1985. The disclosures of both of these papers are incorporated herein by reference.

Figure 3:
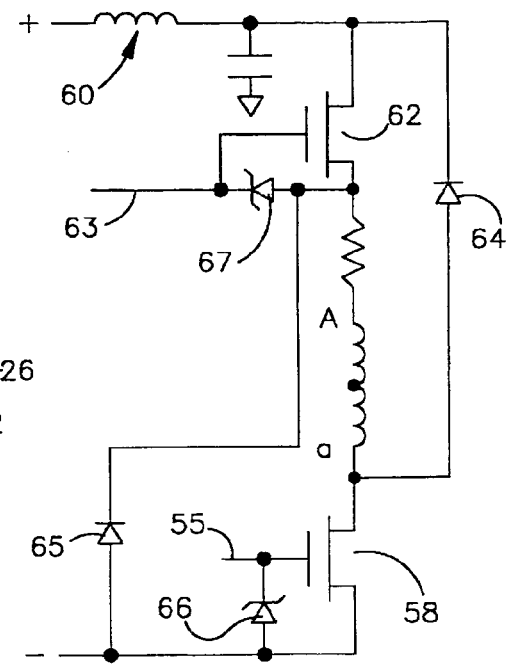
FIG. 3 is a circuit schematic diagram of a portion of the power switches shown in FIG. 1.

FIG. 3 illustrates a power switch circuit of the power switches 56 associated with one stator coil pair Aa. One side of the stator coil Aa is connected to electrical ground through a main drive switch 58. The other side of the stator coil Aa is connected to the vehicle battery through a switch 62 and an LC filter network 60. The drive control circuit 54 (FIG. 1) outputs the motor control signals 55 and 63 to the control terminal of the switch 58 and switch 62, respectively. The motor control signals 55 and 63 are pulse width modulated by the drive control circuit 54 to control the current through the stator coil pair Aa. Diodes 64 and 65 provide fly-back current control. Zener diodes 66 and 67 provide over voltage protection.

Referring back to FIG. 1, the motor 26 is energized through control of the switches 56 to cause the rotor 32 to rotate in the desired direction with the desired torque. Rotation of the rotor 32 results in linear movement of the rack 20. Linear movement of the rack 20 results in turning of the vehicle steerable wheels 22 and 24 to steer the vehicle.

To detect a motor stall condition for the purpose of preventing overheating of the motor 26 or the solid state switches 58 and 62 in the switch circuit 56, the system 10 includes a stall detector 70. The stall detector 70 is operative to control the amount of electrical power being supplied to the electric motor 26 by the power switches 56 in response to a motor stall condition.

A temperature sensor 69, preferably a thermistor, is coupled with the switches 56 for detecting a temperature condition of the switches. The temperature sensor 69 provides an output signal 71 to the stall detector 70 which has a value indicative of the temperature condition of the switches 56. The stall detector 70 continually monitors the temperature of the switches 56 through the output signal 71 from the temperature sensor 69.

The stall detector 70 is responsive to the temperature condition of the switches 56. In particular, the action provided by the stall detector 70 during the existence of a stall condition varies as a function of the switch temperature condition.

The operation of the stall detector 70, (i.e., whether it is enabled or disabled) also may be contingent upon temperature. For example, when the temperature condition of the switches 56 is greater than or equal to a first predetermined threshold temperature, the stall detector 70 is enabled. Conversely, the stall detector 70 is disabled when the temperature condition of the switches 56 is less than the first temperature threshold.

Preferably, when the stall detector 70 is enabled, such as may be based on switch temperature, and a stall condition is detected, the stall detector 70 is operative to reduce electrical power to the motor 26 to a first level. Further, upon determining the existence of a stall condition and upon determining the temperature condition of the switches 56 is greater than the first threshold but less than a second threshold, the stall detector 70 is effective to reduce electrical power to a second level. The second level is different and preferably lower than the first operative level. If the temperature condition of the switches is equal to or exceeds the second temperature threshold, the stall detector 70 is operative to reduce the power applied to the motor to yet a different third level. Illustrative examples of the stall detector 70 controlling the electrical power supplied to the electric motor 26 follow.

Provided the stall detector 70 is enabled, it determines whether a stall condition exists. U.S. Pat. No. 6,333,016 Patent to Miller et. al., which discloses methods for determining whether an electric assist motor is in a stall condition is incorporated by reference in entirety herein.

Figure 5:
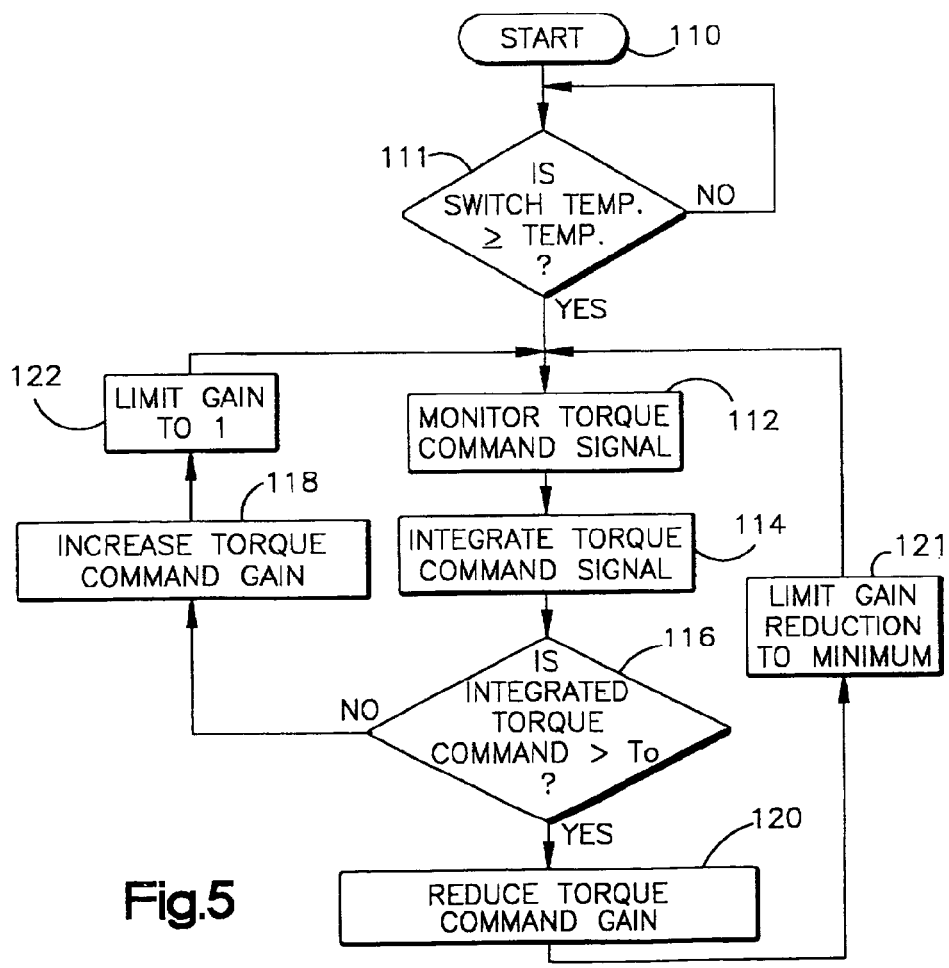
FIG. 5 is a flowchart showing an alternative stall detection process for use with the system of FIG. 1.
Figure 4:
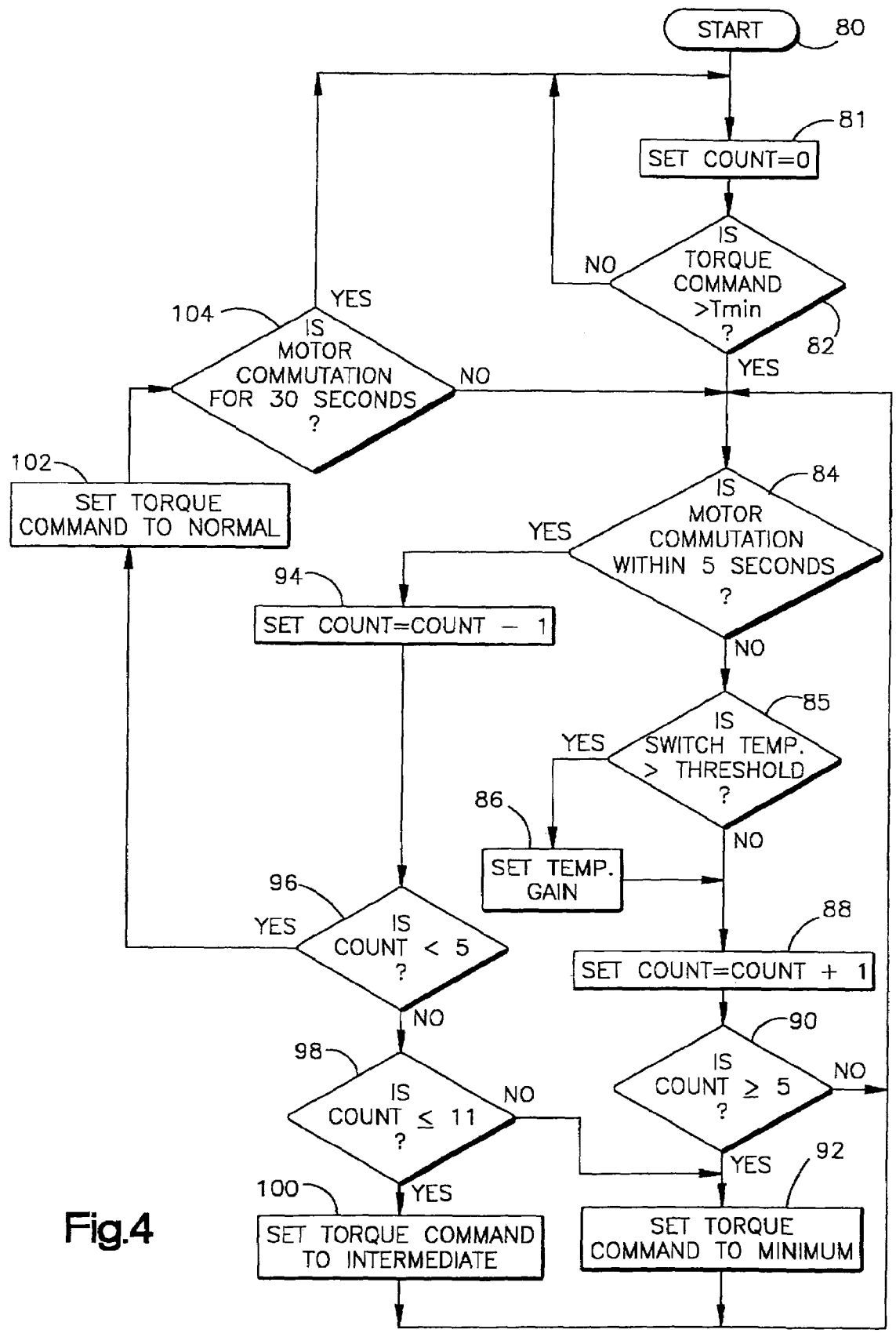
FIG. 4 is a flowchart showing a stall detection process for use with the system of FIG. 1.

The flowcharts for detecting stall conditions are shown in FIGS. 4 and 5 and described fully in the U.S. Pat. No. 6,333,016 to Miller et. al. herein incorporated by reference. Those skilled in the art should also appreciate that the embodiment of FIG. 5 detects over-use of the electric assist steering system. Such over-use occurs, for example, when high motor torque is commanded for an extended period of time even though the motor is moving. Those skilled in the art will appreciate that a stall condition may be an over-use condition, such as where the temperature of the power switches 56 exceed the threshold temperature.

The control processes shown in FIGS. 4 and 5 could be implemented in a single stall and over-use detector 70. In such an implementation, the stall and over-use detector 70 would determine that a stall or over-use condition exists when either or both of the two processes indicates the existence of a stall or over-use condition. In effect, a stall condition is detected as the result of a torque command being greater than a threshold value and no motor commutation for a predetermined time period and an over-use condition is the result of the integrated torque command exceeding a threshold value.

It is also desirable to include self-diagnostic features in the drive control circuit to insure proper operation of the assist arrangement. Such a diagnostic arrangement for an electric assist steering system is fully described in U.S. Pat. No. 4,660,671, to Behr et al., and assigned to TRW Inc., which is hereby incorporated herein by reference.

Figure 6:
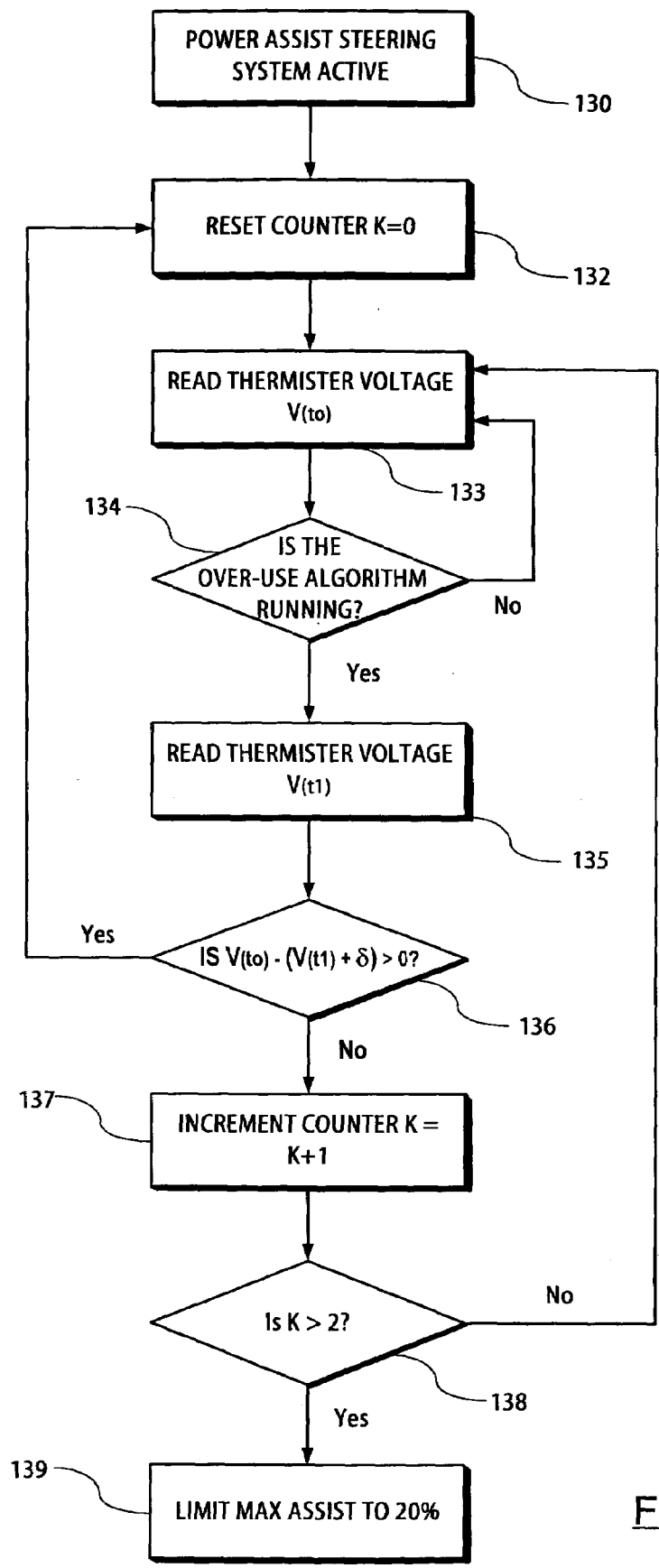
FIG. 6 is a flowchart showing a thermistor failure detection processes for use with the system of FIG. 1.

FIG. 6 illustrates a method for detecting a failed thermistor and provide limited steering assist by the electric assist motor during an over-use condition. An over-use algorithm used for detecting a stall condition is utilized to detect whether a thermistor is non-operational (i.e., failed). The stall or over-use algorithms utilize the thermistor (i.e., temperature sensor) to detect the temperature of a power driving circuitry (e.g., switching circuit, power control circuit) or the electric steering assist motor. Based on the whether the temperature sensed is above or below a respective temperature threshold, the electrical current is reduced for limiting the torque output of the electrical assist motor. However, a non-operational thermistor may eventually lead to a stall condition of the electric assist motor which may result in the loss of assisted steering. Thus, the detection of a non-operational thermistor, and subsequent response thereto, minimizes the risk of damage to the electric assist steering system.

In step 130, a control process begins where the electric steering assist system is activated. In step, 131, a counter is set to zero. The counter records the consecutive number of times a set of temperature measurements are measured and remain unchanged. The electric assist motor, as discussed earlier, outputs a torque which assists to aid in the lateral movement of the rack which consequently moves the steerable wheels. The output torque of the electric assist motor is in direct proportion to the electric current drawn by the electric assist motor. An increase in the output torque (high steering efforts at low speed) requires an increase in the electric current supplied to the electric assist motor. Such increases in the electrical current drawn by the electric assist motor will increase the temperature of power driving circuitry (e.g., switching circuit, power control circuit) or the electric steering assist motor. Conversely, a decrease in the temperature indicates a decrease in the electric current drawn by the electric assist motor. A constant temperature sensed by the thermistor indicates that the electric motor is drawing a constant amount of electrical power and outputting a constant torque. During a temperature measurement by an over-use condition detection algorithm where the integral of torque demand is increasing (over-use algorithm is running or active), a constant temperature may indicate that the thermistor is non-functional.

In step 133, a first voltage measurement ($V_{t0}$) at a time $t_0$, is output from the thermistor and stored in the memory of the controller. When temperature changes, the resistance of the thermistor changes in a predictable way which in turn affects the voltage. From this voltage, a temperature value is obtainable. In step 134, a determination is made whether the over-use algorithm is running. Activation of the over-use algorithm indicates that preliminary conditions are present in which high electric motor torque commands may be occurring for an extended period of time even though the motor is rotating. If the over-use algorithm is not activated, then conditions for over-use is are not presently an issue and detection of the failed thermistor is not required. If the determination is made in step 134 that the over-use algorithm is not activated, then a return is made to step 133 to read an initial thermistor voltage again. If the determination in step 134 is made that the over-use algorithm is currently active, then a next voltage measurement ($V_{t1}$) at time $t_1$ is recorded in step 135. Preferably, the voltage measurement $V_{t1}$ is taken about two seconds after voltage measurement $V_{t0}$. Alternatively, any suitable time interval may be utilized. The time intervals may be fixed or variable. In step 136, a determination is made whether the temperature measurements ($V_{t0}$) and ($V_{t1}$) indicate an increase in temperature. The following is used to determine whether an increase in temperature has occurred:

$$V_{t0} - (V_{t1} + \delta) > 0 \quad \text{(Eq. 1)}$$

Where $\delta$ is a calibration constant that is preferably equal to 5 times the noise level. The thermistor voltage is a direct correlation of the temperature measured. The delta constant ($\delta$) is a constant representing background electrical noise that may be present within the electrical circuit at the time temperature measurements are taken. During an over-use condition, it is assumed that the voltage output from the thermistor is constantly increasing based on the operation of the motor at the respective high loads. That is, as the electric motor continuously operates under high loads, the internal operating temperature of the motor increases while the efficiency of the electrical motor decreases thereby requiring higher voltage to maintain the operating output torque. As a result, it can be expected that during an over-use condition the increase in electrical current drawn by the electrical motor to maintain the output torque results in an increase in the temperature. If a temperature difference between the temperature measurements ($V_{t0}$) and ($V_{t1}$) is not positive, then it is assumed that the temperature is not increasing. However, floor noise present in the first temperature measurement ($V_{t0}$) that may not be present in the second temperature measurement ($V_{t1}$) would falsely provide a positive result (in Eq. 1) by indicating an increase in temperature when in fact, the increase was the result of floor noise. Adding the delta constant ($\delta$) to the second temperature measurement ($V_{t1}$) prior to calculating the temperature difference reduces the chance that floor noise will create a positive result.

If the determination is made that the temperature differential from Eq. 1 is positive, then an assumption is made that the thermistor is operational and a return is made to step 132 to reset the counter and sense for a next set of voltage measurements to monitor and determine the functionality of the thermistor. If the determination is made that result is not positive, then a counter (K) is incremented in step 137. A determination is made in step 138 whether the counter (K) is greater than 2. If the counter (K) is not greater than two, then a return is made to step 133 to sense for a next set of temperature measurements. If the determination is made in step 138 that the counter (K) is greater than two, then it is determined that the thermistor has failed. Alternatively, any other predetermined count number other than two consecutive measurements may be used for determining operation of the thermistor. In step 139, the torque command signal is set so that the adjustable gain amplifier limits the electric current provided to the electric motor for outputting only a fraction of the electric assist motor's maximum available steering assist output. For example, a gain limit may be set at 20% of the maximum gain. Whatever the reduced level, it should be such that the electric assist motor may operate for an extended duration of time at this reduced maximum output without damaging the motor or producing a stall condition. This allows limited steering assist by the electric assist motor while operating the power steering assist system with a failed thermistor during an over-use condition.

From the above description of the invention, those skilled in the art will perceive improvements, changes and modifications. For example, the reduction of electric power, as well as its subsequent increase, has been described as an incremental stepping function over time. It will be appreciated that, alternatively, the control system might provide a time-based ramping function to increase and decrease the electric power. The ramping function may be implemented either as an analog or digital control. These and other similar improvements, changes and modifications within the skill of the art are intended to be covered by the appended claims.

What is claimed is:

1. A method for controlling an electric assist motor in a vehicle steering system during an enablement of an overuse algorithm, said method comprising the steps of:

providing electric power to said electric assist motor of said vehicle steering system via a switching circuit;

sensing a temperature of one of at least said electric assist motor and a power driving circuitry that provides power to said electric assist motor;

determining whether said sensed temperature of said one of at least said electrical assist motor and said power driving circuitry is increasing over a predetermined period of time; and reducing said electric power provided to said electric assist motor in response to a lack of increase in said sensed temperature.

2. The method of claim 1 further including the steps of:
receiving a sensed temperature signal by a stall detector; and
outputting a control signal for adjusting said electric power provided to said electric assist motor.

3. The method of claim 2 further including the step of providing said control signal to a gain amplifier for adjusting a received torque command signal indicative of an applied steering torque input.

4. The method of claim 3 further including the step of providing said adjusted torque command signal to a switching circuit for limiting electric power to said electric assist motor.

5. The method of claim 2 wherein said step of reducing said electric power is further defined by reducing an output of said electric assist motor to a predetermined percentage of a maximum steering assistance output.

6. The method of claim 5 wherein said predetermined percentage is about 20%.

7. The method of claim 1 wherein said step of determining whether said sensed temperature is increasing includes taking a plurality of temperature measurements, and sensing an increase in temperature for a predetermined number of consecutive temperature measurements by the plurality of temperature measurements.

8. The method of claim 7 wherein said predetermined number of consecutive temperature measurements include at least two consecutive temperature measurements.

9. The method of claim 8 wherein said predetermined number of consecutive temperature measurements is taken at fixed time intervals.

10. The method of claim 9 wherein said fixed time intervals are about two second intervals.

11. The method of claim 8 wherein said predetermined number of consecutive temperature measurements is taken at variable time intervals.

12. A method for controlling an electric assist motor in a vehicle steering system during an enablement of an overuse algorithm, said method comprising the steps of:
providing electric power to said electric assist motor of said vehicle steering system via a switching circuit;
sensing a temperature of one of at least said electric assist motor and a power driving circuitry that provides power to said electric assist motor by taking at least two consecutive temperature measurements over a predetermined period of time;
determining whether said sensed temperature of said one of at least said electric assist motor and said power driving circuitry is increasing over said predetermined period of time by adding a calibration constant to said second measured temperature and subtracting said second measured temperature from said first measured temperature and producing a negative temperature difference; and
reducing said electric power provided to said electric assist motor in response to a lack of increase in said sensed temperature.

13. An apparatus for controlling an electric assist motor in a vehicle steering system during an enablement of an over-use algorithm, the apparatus comprising:
a switching circuit for providing electric power to said electric assist motor, said electric assist motor providing steering assistance to said vehicle steering system;
a torque command circuit for providing a torque command signal to said electric assist motor for demanding a respective output torque from said electric assist motor in response an applied steering torque signal;
a temperature sensor coupled to one of at least said electric assist motor and said switching circuit for sensing a temperature of said one of at least said electric assist motor and said switching circuit and for generating an output signal in response to said sensed temperature; and
a stall detector responsive to said output signal from said temperature sensor during an enablement of said over-use algorithm and being operable to reduce said electric power to said electric assist motor by adjusting said torque command signal when said sensed temperature of said one of at least said electric assist motor and said switching circuit does not increase over a predetermined period of time.

14. The apparatus of claim 13 further comprising an adjustable gain amplifier, coupled to said torque command circuit and said stall detector for modifying said torque command signal received from said torque command circuit in response to said stall detector detecting said sensed constant temperature over said predetermined period of time.

15. The apparatus of claim 14 wherein said torque command signal is modified for reducing said torque output of said electric motor to a predetermined percentage of a maximum steering assistance of said electric assist motor.

16. The apparatus of claim 15 wherein said predetermined percentage is about 20%.

17. The apparatus of claim 13 wherein at least two consecutive temperature measurements are taken by said temperature sensor during said predetermined period of time.

18. The apparatus of claim 17 wherein said consecutive temperature measurements are taken at fixed time intervals.

19. The apparatus of claim 18 wherein said fixed time intervals are about two second intervals.

20. The apparatus of claim 17 wherein said temperature measurements are taken at variable time intervals.

* * * * *